US012676248B2

(12) United States Patent
Singh et al.

(10) Patent No.: US 12,676,248 B2
(45) Date of Patent: Jul. 7, 2026

(54) SYSTEM FOR COMPRESSING STEAM FROM A NUCLEAR STEAM SUPPLY SYSTEM TO OPERATE A TURBOGENERATOR

(71) Applicant: Holtec International, Camden, NJ (US)

(72) Inventors: Krishna P. Singh, Jupiter, FL (US); Indresh Rampall, Cherry Hill, NJ (US)

(73) Assignee: Holtec International

( * ) Notice: Subject to any disclaimer, the term of this patent is extended or adjusted under 35 U.S.C. 154(b) by 0 days.

(21) Appl. No.: 18/947,667

(22) Filed: Nov. 14, 2024

(65) Prior Publication Data

US 2025/0069766 A1 Feb. 27, 2025

Related U.S. Application Data

(63) Continuation of application No. 18/406,873, filed on Jan. 8, 2024, now Pat. No. 12,176,116.

(Continued)

(51) Int. Cl.
| | |
|---|---|
| *G21D 1/00* | (2006.01) |
| *F01K 3/00* | (2006.01) |

(Continued)

(52) U.S. Cl.
CPC ............. *G21D 1/006* (2013.01); *F01K 3/006* (2013.01); *F01K 3/181* (2013.01); *F01K 3/265* (2013.01);

(Continued)

(58) Field of Classification Search
CPC .......... F01K 3/181; F01K 3/183; F01K 3/006; F01K 19/02–08

See application file for complete search history.

(56) References Cited

U.S. PATENT DOCUMENTS 3,210,943 A * 10/1965 Acklin ...................... F22B 3/04
60/693
3,300,974 A * 1/1967 Reed ....................... F25B 11/00
60/680

(Continued)

FOREIGN PATENT DOCUMENTS

| DE | 202020003818 | 2/2021 |
|---|---|---|
| JP | 5183603 | 4/2013 |
| WO | 2012/075010 | 6/2012 |

OTHER PUBLICATIONS

Spilling Technologies "Companies and the environment benefit from vapor compression", Energy Technology Cluster Conference: Spilling presents huge potential savings Companies, Press release Nov. 5, 2020, https://clusterkonferenz-energietechnik-2019.b2match. io/home, https://www.spilling.com, Retrieved Dec. 1, 2023, pp. 1-1.

(Continued)

*Primary Examiner* — Laert Dounis
(74) *Attorney, Agent, or Firm* — The Belles Group, P.C.

(57) ABSTRACT

A power generation system and related method for repowering a fossil-fueled power plant using a carbon-free nuclear steam supply system (NSSS) which replaces the existing fossil plant steam generator which burns fossil fuel such as coal, oil, or natural gas. The existing fossil plant energy conversion system including the turbine-generator (turbogenerator) and auxiliary components of the Rankine cycle is retained. The NSSS may include a small modular reactor (SMR) unit comprising a reactor vessel with nuclear fuel core and steam generator which receives heated primary coolant from the reactor to produce main steam to operate the Rankine cycle. The main steam output by the SMR unit is compressed in a steam compressor to increase its pressure to a level necessary to operate the turbogenerator. The compressor may be operated via a portion of the main steam.

(Continued)

SMR Repowered Fossil Plant Turbogenerator Heat Balance Diagram

An intercooler of the compressor may be used for main steam reheating.

20 Claims, 7 Drawing Sheets

Related U.S. Application Data

(60) Provisional application No. 63/510,535, filed on Jun. 27, 2023, provisional application No. 63/437,407, filed on Jan. 6, 2023.

(51) Int. Cl.

| | | |
|---|---|---|
| *F01K 3/18* | (2006.01) | |
| *F01K 3/26* | (2006.01) | |
| *F01K 7/16* | (2006.01) | |
| *F01K 13/02* | (2006.01) | |
| *F01K 19/02* | (2006.01) | |

(52) U.S. Cl.
CPC ................ *F01K 7/16* (2013.01); *F01K 13/02* (2013.01); *F01K 19/02* (2013.01); *F05D 2230/80* (2013.01); *Y02E 30/00* (2013.01)

(56) References Cited

U.S. PATENT DOCUMENTS

| | | | | |
|---|---|---|---|---|
| 3,329,575 A | * | 7/1967 | Burbach | ................. F01K 3/183 |
| | | | | 60/653 |
| 2012/0131921 A1 | * | 5/2012 | Held | ....................... F01K 25/08 |
| | | | | 60/671 |
| 2014/0090377 A1 | | 4/2014 | DiMonte | |
| 2015/0059341 A1 | * | 3/2015 | Tanimura | ............... F01K 25/08 |
| | | | | 60/670 |
| 2017/0337989 A1 | | 11/2017 | Wong | |

OTHER PUBLICATIONS

Schmitz, U. et al "MVR compressor key to steam energy upgrade at Terneuzen polyolefin plant" May 2022 (/magazine/2022/may-2022/), https://www.hydrocarbonprocessing.com/magazine/2022/may-2022/special-focus-biofuels-alternative-fuels-and-green-petrochemicals/mvr-compressor-key-to-steam-energy-upgrade-at-terneuzen-polyolefin-plant/, Retrieved Dec. 6, 2023, pp. 1-7.
Hansen, J. et al. "Investigating Benefits and Challenges of Converting Retiring Coal Plants into Nuclear Plants," Sep. 13, 2022, Retrieved Mar. 13, 2024, Retrieved From the Internet: <URL: https://fuelcycleoptions.inl.gov/SiteAssets/SitePages/Home/C2N2022Report.pdf> entire document.

* cited by examiner

Coal Plant Turbogenerator Diagram

Small Modular Reactor

SMR Repowered Fossil Plant Turbogenerator Heat Balance Diagram

SYSTEM FOR COMPRESSING STEAM FROM A NUCLEAR STEAM SUPPLY SYSTEM TO OPERATE A TURBOGENERATOR

CROSS-REFERENCE TO RELATED APPLICATIONS

The present application is a continuation of U.S. patent application Ser. No. 18/406,873 filed Jan. 8, 2024, which claims the benefit of priority to U.S. Provisional Application No. 63/510,535 filed Jun. 27, 2023, and U.S. Provisional Application No. 63/437,407 filed Jan. 6, 2023; all of which are incorporated herein by reference in their entireties.

FIELD OF THE INVENTION

The present invention relates to systems for producing electric power via the Rankine cycle, and more particularly to a system and related method for converting fossil-fueled power generating plants to clean energy producing plants.

BACKGROUND OF THE INVENTION

There is a worldwide movement to shut down fossil fuel fired power plants which contribute to greenhouse gas emissions in order to protect the environment from further degradation. This is particularly relevant for coal fired power generating plants which are foremost targets for plant shut down. Existing fossil-fueled power plants operate on the steam-to-power Rankine cycle employing turbogenerator sets which convert heat energy of the steam flowing through multiple stages of steam turbines to electric energy via the generator mechanically coupled to the turbines.

Against the environmental urgency to shut down coal-fired plants which produce over half of global power output and substituting them with clean energy installations stands a formidable economic challenge which is the staggering sum of money required to make the transition. The capital required is so immense that to convert from "coal to clean" would wreak havoc on the economies of many developing countries and threaten the stability of their governments. How to transition to clean energy in the developing world without massive economic disruption is the monumental challenge that confronts humankind today. In the developed world, the problem is less acute but nevertheless daunting. It is widely believed that the transition in the developed economies will sharply increase the cost of energy threatening the economic growth rates and their standard of living. The challenge, as discussed in successive COP parlays, is immense and is morphing into the classical Hobson's choice: continued environmental degradation or economic ruin.

Although it would be ideal to retrofit only the steam generator portion of a fossil-fueled power plant in order to retain some original balance of plant equipment to minimize clean energy conversion capital costs, an obstacle persists which prevents simply retrofitting an environmentally green steam generator for the offending fossil-fueled steam generator. The Rankine cycles employed by existing fossil-fueled power plants operate at higher steam temperatures and pressures than the pressures which can be produced by clean energy steam generators including nuclear such as small modular reactors. For example, substitution of a nuclear steam supply system for an existing coal-fueled boiler steam supply system is not possible due to the substantial difference between the pressure and temperature of the steam used in the coal fired plant (>2000 psi and >1000 deg. F.) and that in a nuclear power plant (~1000 psi, <625 deg. F.).

There is a need for a system and related method which allows a fossil-fueled steam generator to be replaced with a clean energy steam generator that is configured to deliver the higher steam pressures required for operating existing fossil-fueled based Rankine cycles in order to retain some balance of plant equipment to minimize capital conversion costs.

SUMMARY OF THE INVENTION

The present invention meets the foregoing needs and helps to address the emerging crisis described above. In particular, a system and related method are disclosed which seeks to ameliorate the impending crisis by re-purposing the fossil-fueled power plant (e.g., coal-powered plants) as nuclear-powered assets that would produce carbon-free energy using controlled fission of uranium as the source of energy for generating steam for the Rankine cycle. A small modular reactor (SMR) system with concomitantly small footprint such as a Holtec SMR-160 or SMR-300 unit available from Holtec International of Camden, NJ, or another SMR, can be deployed to repower and rescue existing retiring coal-fired or other fossil-fueled power plants from complete dismantling so that the plants may be re-deployed as clean energy producing assets using a nuclear steam supply system. The retrofitted SMR system therefore generates the "main steam" used to power the turbogenerator of the existing fossil-fueled power plant which operates on the Rankine cycle to generate electricity.

A fossil fuel fired power generally comprises two major equipment systems; the steam generation system and the energy conversion system. In the case of a coal-fired power plant, as one non-limiting example, the steam generation system includes the coal storage and handling systems including crushers which reduce the size of the coal and pulverizing mills which pulverize the crushed coal into dust-like particles, the coal-fired steam generator or boiler which combusts the pulverized coal and generates high pressure superheated "main steam" at a pressure necessary to operate the turbogenerator, and a plethora of auxiliary equipment which supports the steam generation system and boiler such as the forced draft air fans to convey the pulverized coal into the boiler and provide air of combustion, air pollution control system equipment such as electrostatic precipitators, baghouse (fabric filtration), and flue gas desulphurization (e.g., $SO_2$ scrubbers), etc., and the bottom ash and fly ash handling, storage, and sluice water treatment systems to name a few. These components and equipment collectively enable the generation of the high-pressure steam that is the working fluid of the fossil-fueled power plant operating the Rankine cycle. This fossil-fuel steam generation system of the existing power plant is replaced by the nuclear powered steam generation system according to the present disclosure which is adapted to utilize an SMR unit with modifications.

The energy conversion system of large-scale fossil-fueled power plants (which may have a rated electric power generation capacity of 500 MW-megawatt or more as an example) includes the turbogenerator which typically comprises multiple steam turbine stages that includes a high pressure (HP) turbine, intermediate pressure (IP) turbine, and low pressure (LP) turbine that rotates the turbine shaft or rotor which drives the electric generator. The energy conversion system typically further includes auxiliary components of the Rankine cycle such as without limitation steam de-moisturizer (separator), condenser, boiler feed pumps, feedwater heaters, de-aerator feedwater heater, etc. The turbogenerator has a main steam design inlet steam pressure corresponding to generating electricity which meets the "nameplate" rated capacity of the electric genera-tor (e.g., MW). The energy conversion system portion of the existing fossil-fueled power plant may be retained largely intact and is usable with the SMR steam generation system according to the present disclosure which supplants the fossil-fueled steam production system with a nuclear steam supply system to eliminate greenhouse gas emissions from the plant.

Such grafting of a new nuclear steam generation system with the existing energy conversion system which previously operated on the high-pressure superheated steam generated by the fossil-fueled steam generator poses certain obstacles which the present invention overcomes. One main obstacle as previously noted herein is compatibility of the steam pressure generated by the SMR system with the higher pressure requirements of the existing fossil-fueled plant energy conversion system.

Because the lower main steam pressures generated by a SMR steam generation system are insufficient for operating the energy conversion system of large existing fossil-fuel based power plants with a turbogenerator having high design inlet steam pressure requirements for superheated steam, the present retrofitted SMR nuclear steam supply system includes one or two-stage steam compression to boost the pressure of the main steam from the SMR to a level suitable to supply steam to the existing turbogenerator of the existing fossil-fueled plant. In one embodiment, as further described herein, two-stage steam compression using commercially-available steam compressors with inter-stage cooling may be used to increase the main steam pressure output by the SMR to acceptable steam inlet conditions to operate the existing fossil plant turbogenerator. In some embodiments, the boosted steam pressure may be below the design inlet steam pressure of the existing fossil plant turbogenerator (i.e. HP turbine steam inlet) which nonetheless is still capable of running the turbogenerator with a reduction in electric power generation output below the nameplate rating of the electric generator, but now powered with a clean energy source in lieu of fossil fuel. In other embodiments depending on the rated main steam pressure output by the SMR unit and particularly selection of steam compressor, it is possible that the SMR main steam output pressure may at least meet the design inlet steam pressure of the existing turbogenerator unit. Accordingly, the steam compressor may be configured and operable to deliver main steam to the existing fossil plant turbogenerator at a pressure below or at least meeting the design inlet steam pressure conditions in various embodiments.

In one unique aspect of the repowered fossil plant power generation system using SMR-generated main steam, the intercooler heat exchanger ("intercooler" for brevity) of the steam compressor system may serve dual duty as a high pressure "reheater" heat exchanger for increasing the temperature and superheat of the intermediate pressure (IP) main steam discharged by the high pressure (HP) turbine (the initially higher pressure SMR steam losing pressure upon flowing through and expanding in the HP turbine) before the IP main steam enters the IP turbine, which advantageously enhances the efficiency of the Rankine cycle. Concomitantly, the intercooler uses the cooler IP pressure steam from the HP turbine to decrease the temperature (i.e. cool) of the main steam flowing between the first compression stage and the second compression stage of the steam compressor through the intercooler. The inter-stage main steam flow with a temperature higher than the IP steam leaving the HP turbine therefore yields its heat to the IP steam to raise its temperature. The main steam with boosted or elevated pressure leaving the second stage of the steam compressor flows to the steam inlet of and powers the HP turbine whereas the temperature booster reheated IP steam flows to and powers the IP turbine.

In some embodiments and configuration of the repowered fossil plant power generation system Rankine cycle, a small portion of the main steam flow leaving the SMR steam generator for the turbogenerator may be extracted and used to reheat the LP steam leaving the IP turbine in a LP reheat heat exchanger before entering the LP turbine to further enhance Rankine cycle efficiency. In addition, another portion of the main steam may be extracted and used to operate a steam turbine compressor drive which may be used to power the steam compressor. A majority portion of the main steam output by the SMR steam generator however is used to drive the turbogenerator.

BRIEF DESCRIPTION OF THE DRAWINGS

The features of the exemplary embodiments of the present invention will be described with reference to the following drawings, where like elements are labeled similarly, and in which.

Figure 1:
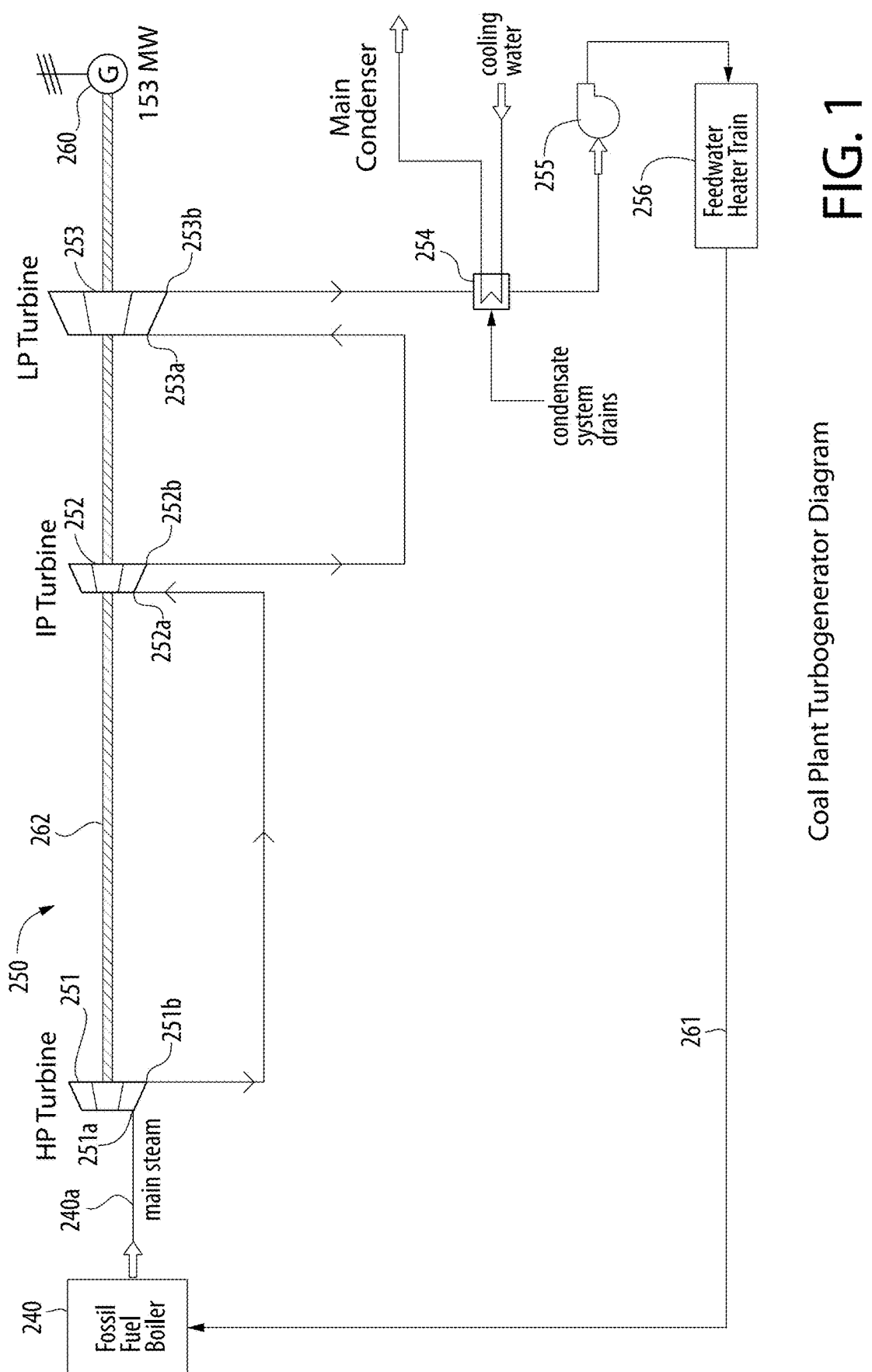
FIG. 1 is a schematic system flow diagram of a conventional large-scale steam-to-electric fossil-fueled power plant operating on the Rankine cycle for power generation.

All drawings are schematic and not necessarily to scale. Parts given a reference numerical designation in one figure may be considered to be the same parts where they appear in other figures without a numerical designation for brevity unless specifically labeled with a different part number and described herein. Any reference herein to a whole figure number herein which may comprise multiple figures with the same whole number but different alphabetical suffixes shall be construed to be a general reference to all those figures sharing the same whole number, unless otherwise indicated.

DETAILED DESCRIPTION OF THE EMBODIMENTS

The features and benefits of the invention are illustrated and described herein by reference to exemplary ("example")

embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion.

These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, all references cited herein to prior patents or patent applications are hereby incorporated by reference in their entireties. In the event of a conflict in a definition in the present disclosure and that of a cited reference, the present disclosure controls.

FIG. 1 is a schematic system flow diagram of a conventional large-scale steam-to-electric fossil-fueled power plant operating on the Rankine cycle for power generation which is amenable to retrofit and repowering with a nuclear steam supply system and steam compression system according to the present disclosure. As with all other system flow diagrams provided with the present application, it bears noting that the flow lines and arrows variously show the direction and progression of the cycle main steam, feedwater, extraction steam, condensate, and other system flows as may be applicable to the respective system.

The fossil power generation plant comprises a steam generation system including a fossil-fueled steam generator 240 (also referred to as simply a "boiler" in the art) which is fluidly coupled via main steam piping 240a to an energy conversion system comprising the turbogenerator 240. A typical larges-scale fossil plant steam generator/boiler is generally a rectangular cuboid structure several stories tall which includes walls formed of tubes which defines a central open space into which fossil fuel (e.g., pulverized coal, oil, or natural gas) is continuously injected and ignited to form a swirling fireball which heats the secondary working fluid (e.g., boiler feedwater) which changes phase from initially liquid entering the tubes of the tube walls at the bottom to superheated steam at the top thereof while flowing upwards in the tubes. Such a steam generator is well known in the art without further elaboration necessary.

The steam generator combusts fossil fuel to heat the initially liquid phase working fluid (typically water) to superheated steam at a design minimum steam inlet pressure of the highest pressure section of the steam turbine necessary to operate the turbogenerator for electric power production. The steam generation system includes the usual auxiliary equipment of a typical fossil-fueled power plant such as the forced draft fan (for pulverized coal) or fuel pumps (for oil or natural gas) to inject the fuel into the steam generator, fuel handling equipment (e.g., coal yard and conveyors, oil or gas storage tanks, etc.), ash handling equipment for coal when used as the fuel, and pollution control equipment for meeting regulatory air and water quality emission standards emitted by the furnace of the steam generator (not shown). This auxiliary equipment is well known in the art without undue elaboration necessary.

The basic Rankine cycle equipment of the energy conversion system (excluding auxiliary systems discussed below) includes the turbogenerator comprising the steam turbine 250 operably coupled to an electric generator 260 via the turbine shaft or rotor 262 which produces electricity. The steam turbine 250 has a design inlet steam pressure necessary to achieve an associated "nameplate" rated electric power output typically measured in megawatts (MW). The fossil-fueled steam generator produces superheated steam at a pressure which typically meets the design inlet steam pressure to achieve the rated electric power output capacity of the generator.

The energy conversion system of the existing fossil power plant further generally includes the usual auxiliary equipment such as for example without limitation the main steam condenser 254 which condenses steam exhausted from the lowest pressure section of the steam turbine back into a liquid state (e.g., condensate), and boiler feedwater pump 255 which takes suction from the condenser 254 to extract and pump the condensate (now referred to as "boiler feedwater" in the art (the secondary working fluid) through a closed flow loop 261 formed by piping which fluidly couples the foregoing components together and to the steam turbine and steam generator. Closed flow loop 261 therefore conveys Rankine cycle secondary working fluid in the steam phase in one portion of the loop upstream of the steam turbine and liquid phase (e.g., boiler feedwater) downstream of the turbine. Sources of cooling water commonly used to condense steam in the main steam condenser 254 may be recirculated water from a cooling tower or once-through water from a lake or river.

The closed flow loop 261 (which includes the main steam piping and internal tube-side of the steam generator 240) includes in operable fluid coupling a plurality of feedwater heaters (i.e. feedwater heater train) which receives feedwater from the feedwater pump and gradually preheats the feedwater to incrementally increase its temperature as it flows through the feedwater heater train back to the boiler to repeat the cycle. The feedwater heaters operate on a portion of steam ("extraction steam" in the art) which is extracted from various stages of the steam turbine 250 at different steam temperatures and pressures. One of the feedwater heaters may be a deaerator which is configured to remove oxygen which can become entrained in the feedwater from condensing the low pressure (LP) turbine exhaust steam in the condenser before it returns to the boiler.

The electric generator 260 is mechanically coupled to the steam turbine and electrically coupled in turn to the power grid (represented by the power line transmission tower shown). Steam produced by the boiler rotates/spins the turbine shaft or rotor 262 via flowing through series of turbine blades of varying lengths. The blades are typically shortest in length in the inlet portion of the turbine and longest at the outlet portion due to the progressively decreasing energy of the steam as it flows through the turbine from the inlet to the outlet. The end portion of the turbine rotor rotates inside the generator within the stator to convert rotary mechanical energy into electric energy in a well known manner in the art.

The turbines of large fossil-fueled power plants (in terms of megawatt (MW) output) generally comprise multiple pressure stages of blades of varying lengths including a high pressure section, intermediate pressure section, and low pressure section which can be provided in various well-known turbine arrangements commonly used in the art. These turbine pressure sections in some embodiments are typically housed in one or more separate outer housings or casings formed of generally heavy-walled cast metal which defines the pressure retention boundary for the steam as it travels through the various turbine pressure sections. The turbine pressure sections are generally referred to in the art as including the high pressure (HP) turbine 251, intermediate pressure (IP) turbine 252, and low pressure (LP) turbine 253 as shown in FIG. 1 when these sections are housed in separate casings; all of which may be collectively referred to in the singular for brevity as the "steam turbine" which actually is a turbine assembly of the various turbine pressure sections.

It bears noting that the HP, IP, and LP pressure designations for the turbines are references to "relative" pressures with respect to each other as the terms are commonly used in the art; each turbine operating at a different inlet steam pressure. Accordingly, the pressure of the Rankine cycle high pressure (HP) steam generated by the steam generator or boiler entering the HP turbine is greater than the pressure of intermediate pressure (IP) steam entering the IP turbine, and the intermediate pressure steam is in turn greater than the pressure of the low pressure (LP) steam entering the LP turbine.

Figure 7:
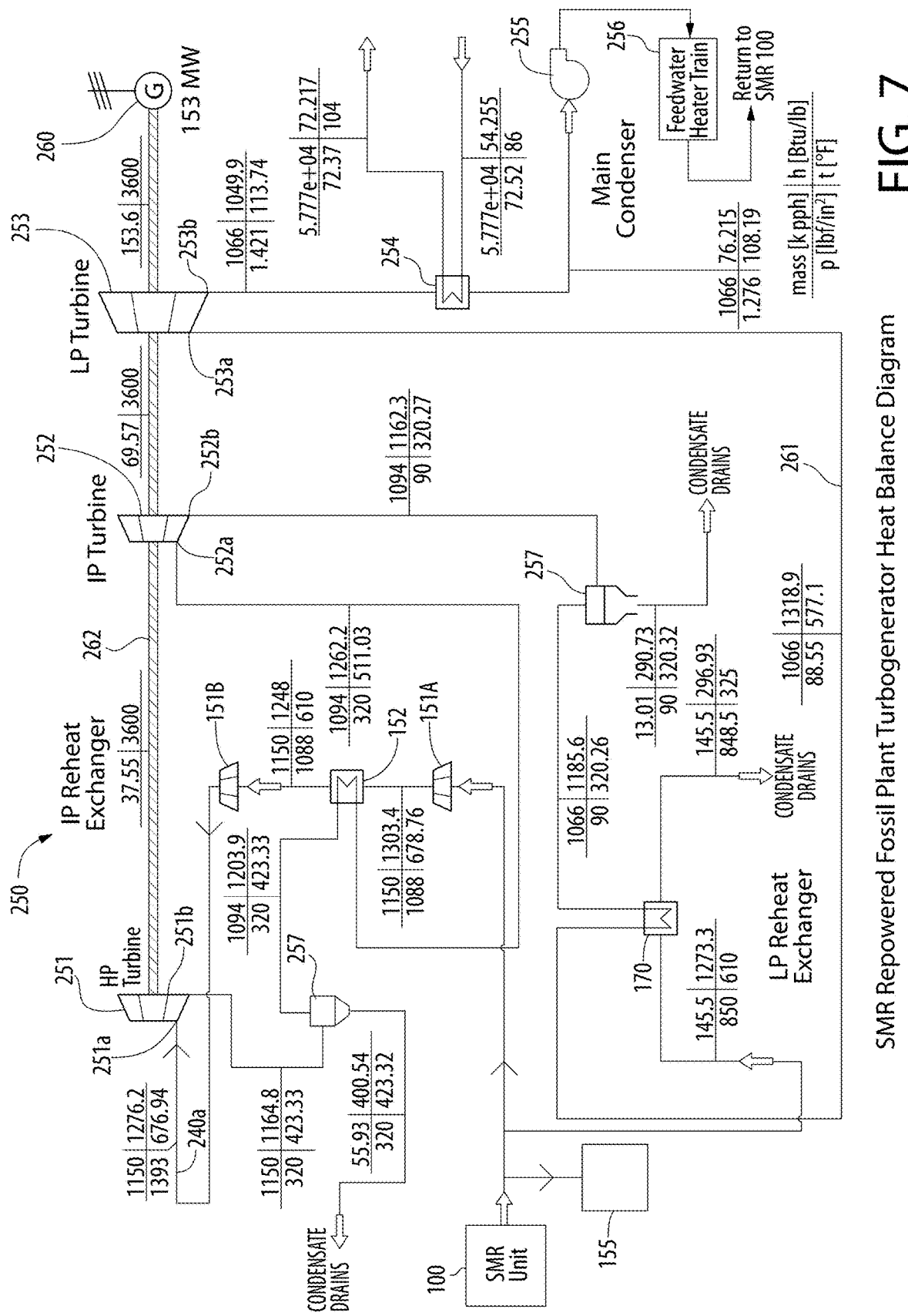
FIG. 7 is a schematic system flow diagram of a hybrid repowered fossil-fueled plant according to the present disclosure with a carbon-free nuclear steam supply system and existing fossil plant energy conversion system with turbogenerator.

Each of the HP, IP, and LP turbines 251, 252, 253 includes (respectively) a steam inlet 251a, 252a, 253a at one end which receives steam, and a steam outlet 251b, 252b, 253b at the opposite end which exhausts or discharges the steam as shown by the steam flow arrows and flow lines in FIGS. 1 and 7. As the terminology is used in the art, the steam entering the HP turbine 251 is referred to as HP (high pressure) steam. The steam leaving the HP turbine is referred to as IP (intermediate pressure) steam since the steam has lost pressure and temperature as the steam progressively flows through the various length turbine blades coupled to the turbine shaft or rotor and expands. The steam entering the IP turbine is the IP steam while the steam leaving the IP turbine which has lost temperature and pressure as it expands is referred to as LP (low pressure) steam.

Various steam turbine and casing arrangements may be used which are commonly known in the art. As non-limiting examples, a single casing turbine arrangement comprises a single casing for a rotating bladed turbine shaft or rotor therein which is mechanically coupled to the electric generator. A tandem compound arrangement includes two or more casings for different turbine pressure sections which are all coupled together in series to rotate a single turbine shaft to power a single electric generator. Two, three, or four casing turbines may be provided. The high pressure and intermediate pressure turbines may be combined in a single casing for compactness. In addition, two low pressure turbines each in a separate casing may be provided in some designs. The number of casings is influenced by the design steam exhaust conditions at least in part associated with the low pressure turbine. A cross compound turbine arrangement employs two or more turbine shafts which power two or more generators. Double axial flow arrangements known in the art may be used in some or all of the casings of the foregoing arrangements in which steam is introduced into the middle of the bladed turbine shaft and flows in opposite direction towards each end of the shaft while passing through mirror-imaged sets of turbine blades. Any arrangement of the steam turbine and casings may be used with the present invention. Steam reheating may also be employed in some large fossil power plant turbine installations between the high pressure and intermediate pressure sections. In reheat steam turbine designs, steam leaving the high pressure section is temporarily bypassed and returned back through the steam generator to be reheated before flowing to and entering the intermediate pressure section of the turbine for improved cycle efficiency.

The Rankine cycle, steam turbines and casing arrangements, and operation of the energy conversion system components for electric power generating plants are well known to those skilled in the art without further undue elaboration being necessary here and do not limit application of the present invention.

Figure 2:
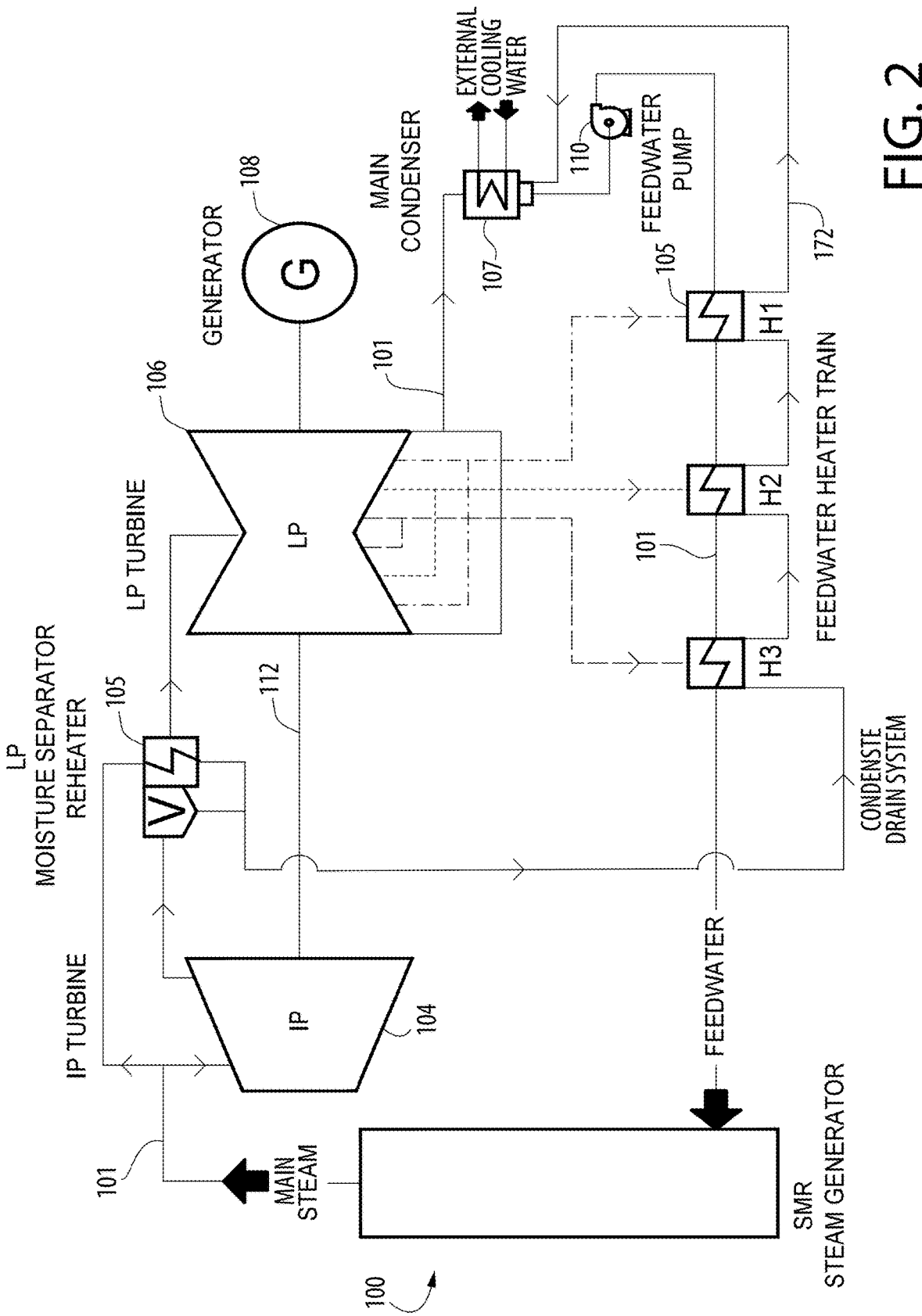
FIG. 2 is a schematic system flow diagram of one embodiment of a small modular reactor (SMR) power generation system using nuclear fuel as the carbon-free energy source for producing steam.
Figure 3:
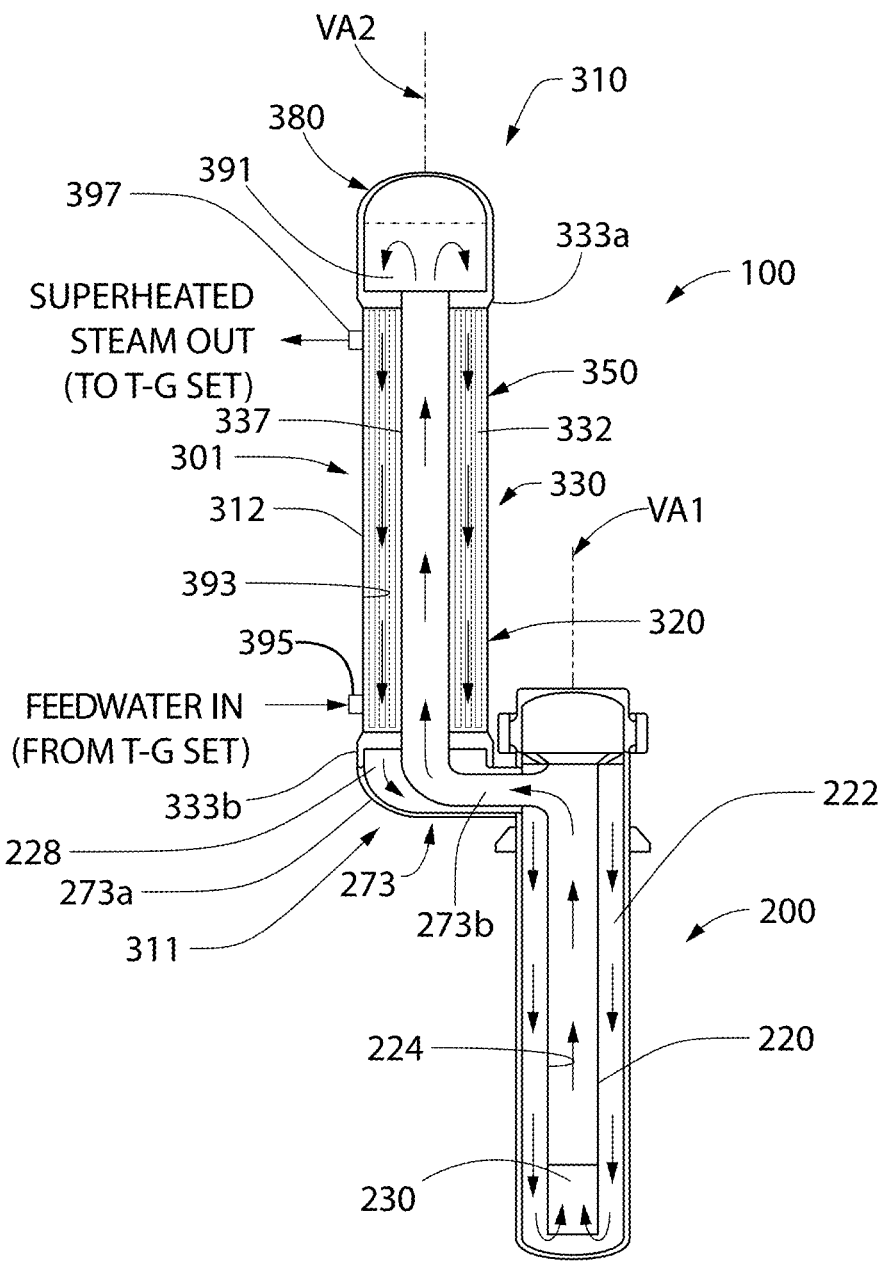
FIG. 3 is a schematic diagram of an exemplary SMR unit which provides a nuclear steam supply system usable with the present invention to replace an existing fossil power plant steam generator which combusts fossil fuel.

FIG. 2 depicts a schematic system flow diagram of nuclear steam supply system comprising a small modular reactor (SMR) unit 100 operated to produce steam which thermally powers the energy conversion system for comparison to the foregoing conventional fossil-fueled electric generating system of FIG. 1. FIG. 3 is a schematic diagram of one exemplary but non-limiting embodiment of a SMR unit which may be used with embodiments of the present invention. Small modular reactors are generally defined in the art as having a power output capacity up to and including 300 MW (megawatts) of electric power versus large convention reactor units having power outputs of 700 MW or more.

The SMR unit 100, which forms the nuclear steam supply system, generally comprises a steam generator 301 and nuclear reactor including a nuclear fuel core 230 comprising uranium-containing fuel rods housed in a reactor vessel 200 containing primary coolant. The reactor vessel may be vertically elongated in one embodiment and includes a vertical cylindrical inner reactor shroud 220 which encloses the fuel core and defines a riser column 224 fluidly coupled to the steam generator 301 to provide heated primary coolant thereto. An annular downcomer 222 is formed in the space between shroud 220 and the shell of the reactor vessel 200 also fluidly coupled to steam generator 301. The downcomer receives cooled primary coolant returned from the steam generator 301 and may extend vertically for a majority of the height of the reactor vessel.

The primary coolant heated by the reactor core 230 circulates via a closed flow loop through the fluidly coupled steam generator 301 which heats a secondary working fluid such as water (or another phase change fluid) which changes phase from liquid to superheated steam that flows to and powers the turbogenerator (i.e. turbine-generator) in the Rankine cycle closed flow loop 101 formed by main cycle flow conduits such as piping (see, e.g., FIG. 2). The primary coolant may be passively circulated between the reactor vessel and steam generator without the assistance of pumps via gravity-assisted natural thermo-siphon flow based on the changing density of the primary coolant (see primary coolant directional flow arrows in FIG. 3). The is achieved in part by arranging the steam generator 301 in a vertically staggered position with respect to the reactor vessel 200 such that a majority of the height of the steam generator is located at a higher elevation than a majority of the height of the reactor vessel as shown in FIG. 3.

Suitable small modular reactors with natural thermo-siphon circulation of primary coolant include the SMR-160 or others available from SMR, LLC of Camden, New Jersey, a subsidiary of Holtec International. Non-limiting examples of such SMR units is disclosed in commonly-owned U.S. Pat. No. 10,395,783 and U.S. Patent Publication No. 2012/0142920, which are incorporated herein by reference. SMRs from other manufacturers may be used with the presently disclosed repowering scheme for fossil-fueled power plants. In addition, SMR units with pumped primary coolant flow between the reactor vessel and steam generator may be used and does not limit application of the present invention and fossil plant retrofit with a nuclear steam supply system.

Steam generator 301 of the SMR unit 100 may be a vertically-elongated structure generally including steam generating vessel 300 which includes a top 310, bottom 311, and a vertically extending hollow cylindrical shell 312 extending therebetween which defines an internal cavity 393 for holding a plurality of heat exchange components. Steam generating vessel 300 further includes a top tubesheet 333*a*, bottom tubesheet 333*b*, a tube bundle comprising a plurality of heat transfer tubes 332 extending vertically between the tubesheets, an internal riser pipe 337, and pressurizer 380 disposed on the top 310 of the vessel. Heat transfer tubes 332 (only a few of which are shown schematically in FIG. 3 to avoid cluttering the image) may be straight and extend vertically in the annular space between riser pipe 337 and the steam generator shell 312 all the way around the full circumference of the riser pipe.

Steam generator vessel 300 defines a vertical axis VA2 which is parallel to vertical axis VA1 of the reactor vessel 200. The steam generator vessel and reactor vessel are physically closely coupled and fluidly coupled together via a short double-walled primary coolant fluid coupling 273. The term "closely coupled" as used herein means that the outer shell of the reactor vessel is horizontally spaced apart from the outer shell of the steam generator by a distance which is no more than the outer diameter of the steam generator in one embodiment as shown. This advantageously and largely eliminates exposure to large-pipe rupture incidents in systems which use long piping rungs for conveying primary coolant between the reactor vessel and steam generator.

Primary coolant fluid coupling 273 in one embodiment comprises an outer flow conduit 273*b* and inner flow conduit 273*a* nested therein as shown schematically in FIG. 3. Outer flow conduit 273*b* is fluidly coupled to downcomer 222 in reactor vessel 200 and inner flow conduit 273*a* is fluidly coupled to riser 220 in the reactor vessel. As shown by the primary coolant flow arrows in FIG. 3, heated primary coolant from the reactor core flows vertically upwards in riser pipe 337 to top distribution plenum 391, and changes direction to flow downwards inside the heat transfer tubes 332 on the tube-side to the bottom flow plenum 228 inside fluid coupling 273 which collects the cooled primary coolant which is then returned to the reactor vessel 200 for reheating in the closed primary coolant flow loop formed between the reactor vessel and steam generator.

The secondary working fluid (e.g., water) flows vertically upwards on the shell-side of the heat transfer tubes 223 in steam generator 301. The secondary working fluid is gradually heated from liquid state or phase entering the feedwater inlet nozzle(s) 395 at the bottom of the steam generator shell 312 to superheated steam exiting the secondary working fluid outlet nozzle(s) 397 at the top of the shell. The heat transfer tubes 332 of the tube bundle in steam generator 301 may define a lower preheater section 320 which begins heating the liquid phase secondary working fluid (e.g., water), a contiguous steam generator section 330 above the preheater section in which the water boils to form saturated steam, and an upper superheater section 350 which converts the saturated steam to superheated conditions which is supplied to the turbogenerator as the main steam.

It bears noting that numerous design variations and arrangements of an SMR including the steam generator and reactor vessel may be used with embodiments of the present invention besides the non-limiting exemplary embodiment disclosed herein. The invention is therefore not limited by the configuration and arrangement of the SMR so long as the SMR can output steam which can be transformed into conditions usable in the turbogenerator of the energy conversion system in the manner disclosed and described in further detail herein.

With continuing reference to FIGS. 2 and 3 as applicable, the steam from steam generator 103 flows through the energy conversion system portion of the nuclear power plant which generally includes (in operable fluid coupling and order following the steam path) the intermediate pressure (IP) turbine 104, moisture separator reheater 105, lower pressure (LP) turbine 106, and main steam condenser 107. The condenser receives cooling water from the cooling water system to condense the steam exhausted by the LP turbine. The feedwater pump 110 takes suction from the condenser to extract the condensate (feedwater) which is then pumped through the feedwater heater train which may include 2 or more feedwater heaters. Three feedwater heaters designated H1, H2, and H3 are shown in the non-limiting illustrated embodiment as an example; however, other suitable numbers of feedwater heaters may be provided depending on the Rankine cycle requirements to optimize cycle efficiency for steam-to-electric production. Steam extracted at various points of the steam path through the LP turbine 106 (i.e. "extraction steam" in the art) is provided to the feedwater heaters to gradually increase the temperature of the feedwater as it flows in a cascading manner through each heater. The preheated feedwater is finally returned to the steam generator 103 via the closed flow loop 101 which is formed from the steam generator 103 through the turbines, moisture separator, condenser, feedwater heaters, and back to the steam generator as shown in FIG. 2 to fluidly couple these components together via suitable external flow conduits such as piping forming the closed flow loop.

Feedwater heaters H1-H3 used for feedwater heating in Rankine cycle energy conversion systems such as that shown in the SMR powered system of FIG. 2 are generally shell-and-tube type heat exchangers in which steam flows on the external shell-side of the tubes in the tube bundle and the liquid feedwater flows on the internal tube-side of the tubes. The heat exchangers thus define two internal fluid paths which are fluidly isolated from each other to convey two working fluids which exchange thermal energy through the tube walls. Any suitable commercially-available feedwater heater may be used.

The moisture separator reheater 105 is fluidly interspersed in the cycle steam flow path between the IP and LP turbines as shown in FIG. 2. The moisture separator reheater 105 uses a bypassed portion of steam entering the IP turbine from the SMR unit to reheat the cycle steam flowing from the IP turbine to the LP turbine in order to remove moisture from the cycle steam. The separated moisture, which is liquid condensate, drains back to condensate system which collects condensate (condensed steam) from each of the feedwater heaters H1-H3 as shown. The collected condensate cascades (flows) back through the feedwater heater train as shown in FIG. 2 and to the main steam condenser 107 where it becomes mixed with the condensed steam leaving the LP turbine to collectively form the boiler feedwater. Suitable moisture separator reheaters are commercially-available from numerous suppliers.

The IP and LP turbines 104, 106 of the SMR power generation system are mechanically coupled via the turbine shaft or rotor 112 to electric generator 108 operably connected to the electric power grid (see, e.g., FIG. 2). Generator 108 converts mechanical energy into three-phase electric energy (electricity) via the stator windings in the generator in the conventional manner well known in the art.

Representative but non-limiting thermal parameters associated with the SMR power generation system capable of producing 160 MW (Megawatts) of power is shown in Table 1 below.

TABLE 1

| SMR-160 Nuclear Power Cycle Operating Parameters | |
| --- | --- |
| Pressure | 850 psia |
| Temperature | 610° F. |
| Flow | 1.674 million lb/hr |
| Superheat | 85° F. |
| Feedwater Temperature | 256° F. |
| Net Electric Power | 160 MW |

By contrast to the SMR 160 MW thermal parameters, representative thermal parameters associated with a large-scale fossil-fueled power generation plant (coal-fired in this example) are shown in Table 2 below.

TABLE 2

| Example Coal Plant Steam Cycle Operating Parameters | |
| --- | --- |
| Pressure | 2175 psia |
| Temperature | 995° F. |
| Flow | 1.38 million lb/hr |
| Superheat | 648° F. |
| Feedwater Temperature | 466° F. |
| Net Electric Power | 210 MW |

As noted in Table 2, the operating steam pressure and temperature conditions required by the exemplary coal plant (2175 psia/995 degrees F.) exceeds the delivered steam operating temperature and pressure output of the exemplary SMR plant (850 psia/610 degrees F.). Accordingly, direct replacement of the coal-fired boiler (steam generator) with an SMR steam generator is not possible due to the mismatch in steam conditions. The steam produced by the SMR unit 100 thus cannot be directly used to run a coal or other fossil power plant's turbogenerator. Therefore, the main steam output by the SMR unit must be pressurized to conform to the existing fossil plant's main steam enthalpy requirements to the maximum extent possible.

For this purpose, the present invention utilizes a portion of the nuclear plant's main steam output in a steam compression system which includes a steam compressor, such as a turbo-compressor, to isentropically compress the steam to the desired pressure for use in the fossil-fueled plant energy conversion system. Turbo-compressors comprise series of radial blades arranged along a shaft as opposed to centrifugal compressor designs. Other compressor designs besides turbo-compressors however may be used if appropriate to achieve the desired increase in main steam pressure necessary to operate the existing fossil plant turbogenerator at its rated nameplate electric power output capacity (MW) or at a lower pressure with concomitant reduction in electric power output if acceptable. The fossil-fueled plant may be but is not limited to a coal-fired plant in one embodiment.

Figure 5:
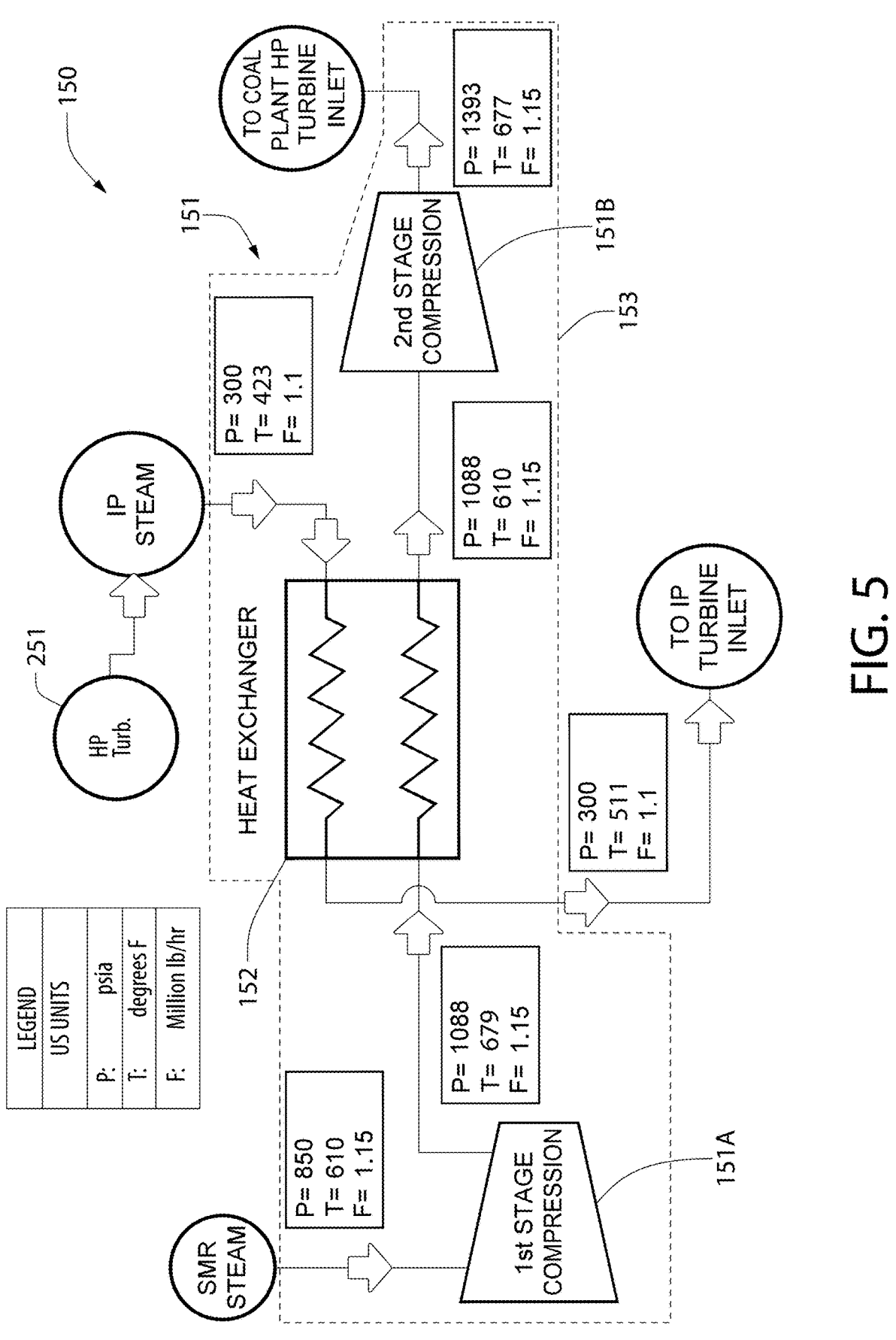
FIG. 5 is a schematic system flow diagram of a two-stage steam compressor with intercooling usable with the present invention.

As can be seen from comparison of the preceding Tables 1 and 2, the pressure of the main steam produced by the nuclear plant (SMR) is considerably lower than that of the coal-fired power plant. This significant pressure "delta" applies to virtually in every coal plant vis-à-vis a light water reactor plant such as a SMR. In order to boost the steam pressure of the nuclear plant, it is necessary to raise its pressure which can be accomplished by a suitable turbo-compressor. The turbo-compressor is commercially-available available in single or multi-stage configuration. A multi-stage steam compressor (two-stage) is shown in FIG. 5. After exiting at least the first compression stage, the superheat in the main steam needs to be tempered (partially de-superheated) before it enters the next stage. The tempering of the steam can be beneficially implemented via an intercooler heat exchanger 152 as shown using energy conversion system cycle steam driving the inter-stages of the existing fossil plant turbines while concomitantly increasing the turbine inter-stage steam enthalpy to enhance the Rankine cycle heat rate and efficiency.

Figure 4:
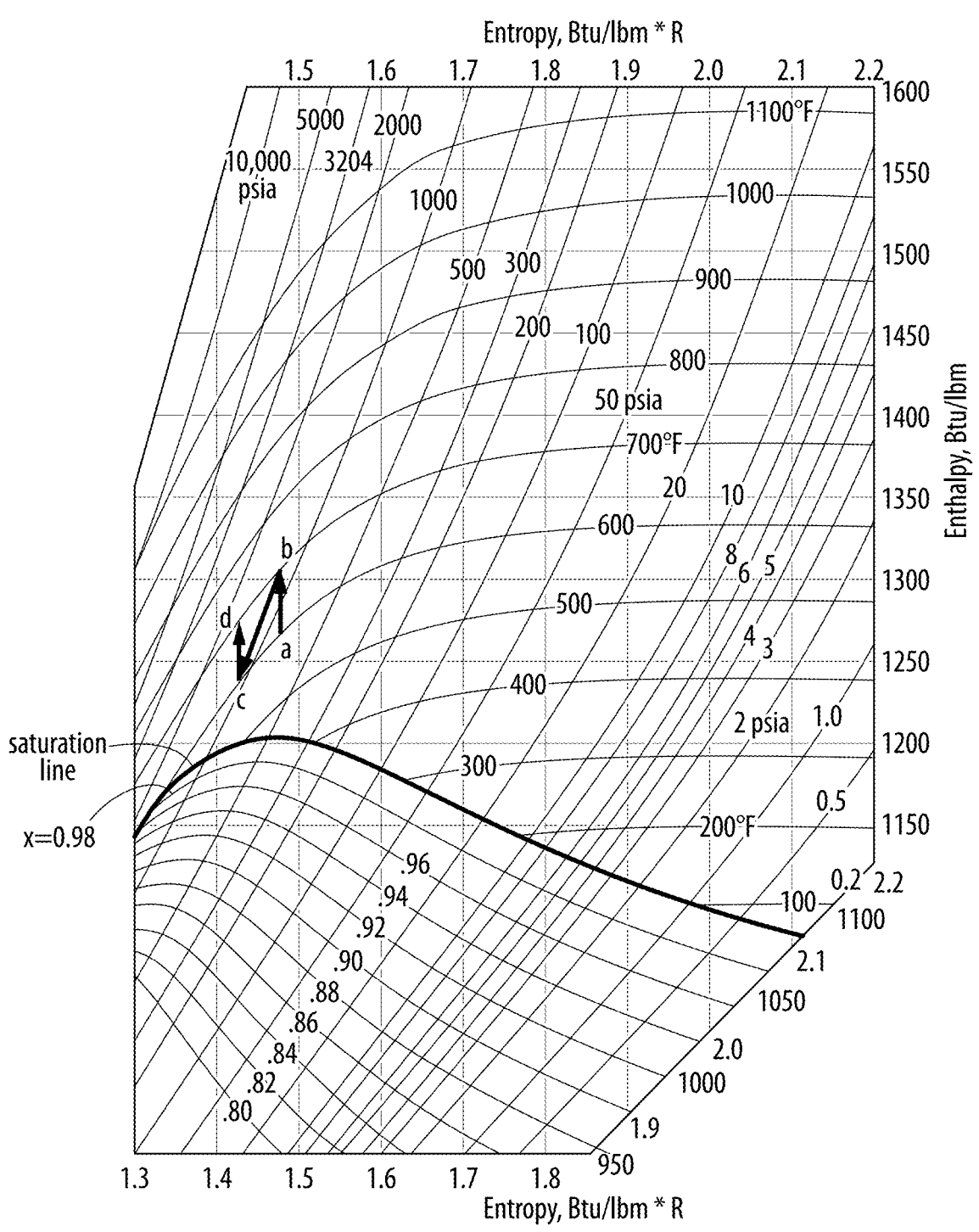
FIG. 4 is a Steam Mollier Chart showing the thermodynamics of multi-stage steam compression with intercooling of the steam generated by the SMR unit.

FIG. 4 illustrates a Mollier Chart showing the change in the enthalpy of the main steam being isentropically compressed by the steam compressor 151. Specifically, the Chart shows multi-stage steam compression with intercooling between stages (two-stage compressor shown: 1st stage— a-b, Intercooling: b-c, 2nd stage: c-d). In principle, the steam can be compressed to the desired pressure using the multi-stage process with partial de-superheating at the end of each stage. An increase in the number of stages will allow the compressed steam pressure to approach the coal-fired power plant's pressure closely. However, the plant can be run with a somewhat lower steam pressure than shown in Table 2 thereby leading to a certain loss of Rankine efficiency and electric power output if justified by a cost-benefit evaluation and acceptable to the end user. The post turbo-compressor pressurized steam with increased pressure provides the main steam generated by nuclear power which is introduced to the fossil-fueled plant's existing energy conversion system with turbogenerator for electric power generation.

According to one aspect of the present disclosure, therefore, the steam output from the SMR unit 100 steam generator is therefore boosted in pressure via the steam compression system 150 to meet the requirements of the fossil plant existing energy conversion system. One non-limiting embodiment of a steam compression system 150 is shown schematically in the process flow diagram of FIG. 5. FIG. 4 noted above shows the associated thermodynamics of the two-stage steam isentropic steam compression on the Steam Mollier Chart as previously described herein.

Steam compression system 150 includes two-stage steam compressor 151 in one embodiment including a first stage steam compressor 151A and second stage steam compressor 151B. The compressors may be housed in a single outer equipment housing 153 (represented by dashed lines in FIG. 5), or two separate housings. Intercooler heat exchanger 152 ("intercooler" for brevity) may be fluidly interposed and coupled between the compression stages in one embodiment to reduce the temperature and superheat of the main steam before compression in the second stage. The intercooler may be a shell and tube heat exchanger in one embodiment (similar to heaters H1-H3 previously described herein) of any suitable configuration (e.g., single pass tube bundle with straight tubes, double pass U-tube bundle, etc.). The intercooler therefore defines two internal fluid paths which are fluidly isolated from each other to convey the main steam in one fluid path and the lower temperature heat exchange medium or fluid which cools the compressor inter-stage main steam. Various types of suitable shell and tube heat exchangers are commercially-available and well known in the art without further elaboration necessary here.

The lower temperature heat exchange medium or fluid which cools the inter-stage main steam flowing through intercooler 152 in one embodiment comprises intermediate pressure steam discharged by the HP turbine 251 of the fossil power plant's energy conversion system as shown in FIG. 7. The compressed steam from the first stage steam compressor 151A may flow through the shell-side of the intercooler heat exchanger while the cooler heat exchange fluid (IP pressure steam) may flow on the shell-side, or vice-versa. FIG. 5 shows the steam compression system with intercooler and exemplary representative mass flow rates, pressures, and temperatures of the heat exchange fluid (IP steam) and main steam through the compression process and intercooler heating.

Notably, in one unique aspect of the invention as previously noted above, the intercooler 152 serves a dual function as a high pressure "reheater" heat exchanger configured and operable to increase the temperature of the intermediate pressure (IP) steam discharged by the high pressure (HP) turbine 251 before flowing to the IP turbine 252, while concomitantly decreasing the temperature of the inter-stage main steam flowing from the first compression stage to the second compression stage of the steam compressor through the intercooler (see, e.g., FIGS. 5 and 7).

In one embodiment and configuration of the repowered fossil plant power generation system Rankine cycle, a small minority portion of the main steam leaving the SMR steam generator 301 which flows to the existing fossil plant turbogenerator may be extracted to bypass the turbogenerator and is used to reheat the LP steam leaving the IP turbine 252. Table 3 shown below shows estimated main steam allocations for steam output by the SMR unit 100, including 145,000 lb/hr allocated for the LP steam reheating. The higher temperature extracted portion of the main steam from the SMR unit flows through the LP (low pressure) reheat heat exchanger 170 and transfers its heat to the lower pressure LP steam from the IP turbine; the arrangement being shown in FIG. 7. LP reheat heat exchanger 170 thus increases the temperature of the LP steam from the IP turbine before flowing to the inlet of the LP turbine which advantageously further enhances Rankine cycle efficiency. Any suitable type and configuration of a shell and tube heat exchanger known in the art may be used for the LP reheat heat exchanger. The lower temperature LP steam may flow through the tube-side of the heat exchanger and the extracted higher temperature main steam (heating working medium or fluid) may be flow on the shell-side, or vice-versa.

Heat balance modeling and calculations were performed and results are summarized in the SMR repowered fossil plant heat balance diagram shown in FIG. 7 which employs SMR unit 100 to retrofit and replace a coal-fired steam generator whose thermal parameters are listed in Table 2 (or other fossil-fueled steam generator) with a nuclear steam supply system in accordance with the present disclosure. Table 3 below shows the theoretical allocation of the steam output by the steam generator of the SMR unit for the repowered energy conversion system of the existing fossil plant, as further described below.

The compression of the SMR steam may be carried out in one or two stages as necessary to provide the required pressure boost. For illustrative and heat balance modeling purposes, without limitation, the compression of the reactor steam was assumed to be carried out in two stages and powered by a steam turbine compressor drive 155 operated by another extraced portion of the main steam output from the SMR unit. It was further assumed that about two-thirds of the SMR's 1.674 million lb/hr (pounds/hour or PPH) total steam output, or about 1.15 million lb/hr, is directed to power generation in the existing fossil plant's turbogenerator (energy conversion system). About 185 thousand lb/hr of the SMR's steam output was assumed to be used for driving the steam compressor. The balance of the steam is used elsewhere in the energy conversion for the LP steam reheating previously described herein and feedwater heating as defined in Table 3.

TABLE 3

| SMR-160 Steam Allocation | |
| --- | --- |
| SMR-160 Steam Production | 1.674 million lb/hr |
| Coal Plant Turbogenerator Operation | 1.15 million lb/hr |
| Steam Turbine Compressor Drive | 185 thousand lb/hr |
| LP Steam Reheating | 145 thousand lb/hr |
| Feedwater Heating | 194 thousand lb/hr |

To render the SMR steam suitable for operating the existing coal plant turbogenerator whose thermal parameters are listed in Table 2, the SMR steam is compressed in two-stage steam compressor 151 to a pressure of 1393 psia in the heat balance modeling. Inter-stage cooling is provided using the SMR's surplus steam below to lower compressor's $1^{st}$ stage discharge temperature calculated at 679 deg. F. to 610 deg. F. (see, e.g., FIG. 5). Referring generally to FIGS. 4 and 5, superheated SMR steam is isentropically compressed in the first stage to 1088 psia. As shown in the Steam Mollier Chart of FIG. 4, steam compression involves a substantial temperature increase (almost 70° F.) ensuring steam remains in the superheated state. In practice this increased superheat requires tempering using the intercooler 152. Intercooling is performed using intermediate pressure (IP) steam of the Rankine cycle exhausted from the high pressure (HP) turbine 251 to enhance the enthalpy of the IP steam used to drive the intermediate turbine 252 (see, e.g., FIGS. 1 and 7). As an example, FIG. 5 illustrates deploying IP steam at a temperature of 423° F. which cools the first stage compressor steam output at 679 deg. F. down to 610° F. entering the second stage compressor in the intercooler 152 heat exchanger. In this manner the IP steam is heated to 511 deg. F. The tempered steam exiting the intercooler 152 is compressed in the second stage compressor to a pressure of 1393 psia for the steam inlet of the HP turbine 251 to effectuate the existing coal plant turbogenerator operation (i.e. energy conversion system).

Figure 6:
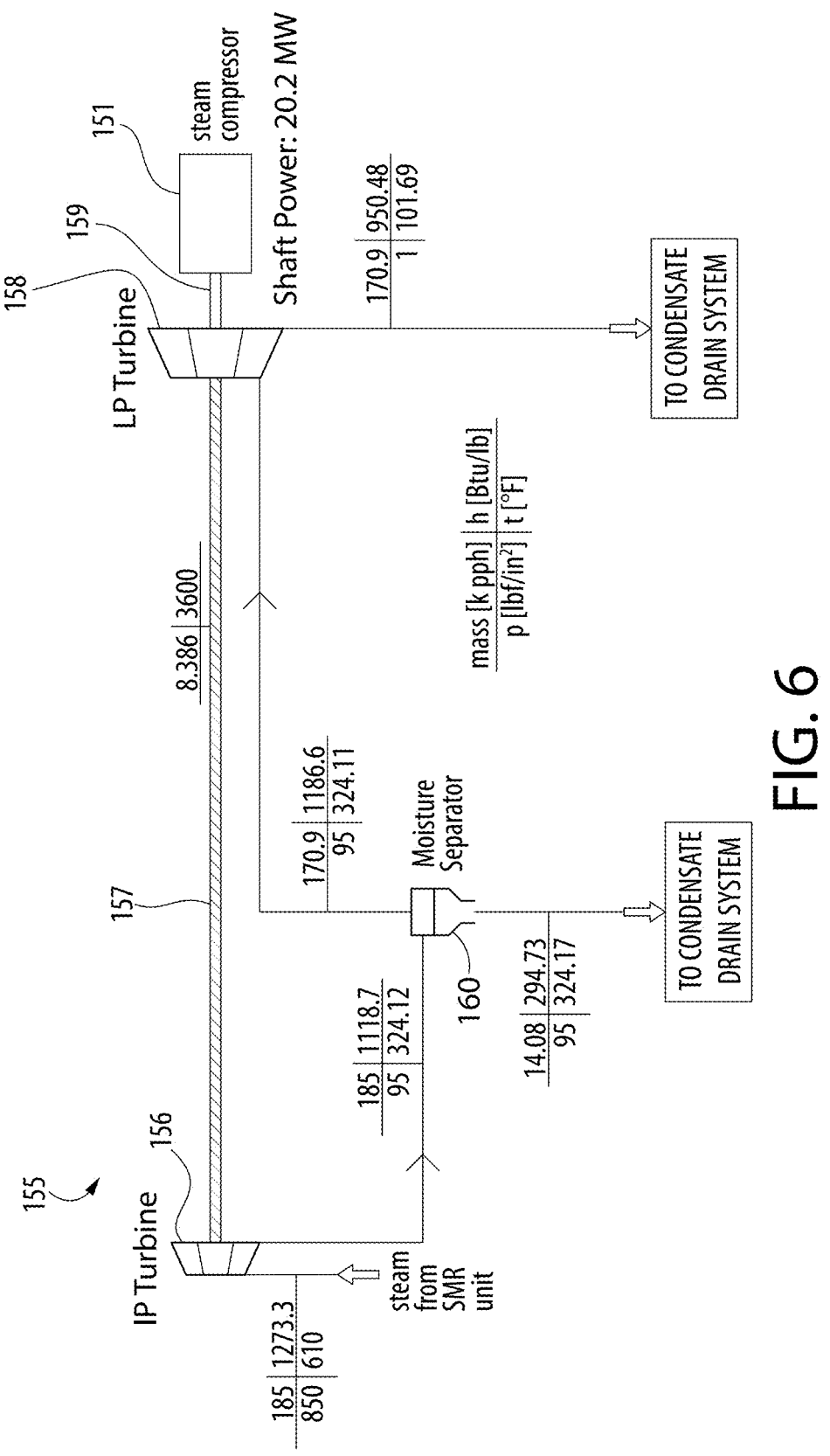
FIG. 6 is a schematic system flow diagram of a steam turbine compressor drive system used to power the steam compressor.

Steam compressor sizing calculations to accomplish the above steam compression indicate that the two-stage compression requires 19.67 MW power to drive steam compressor 151. In one embodiment according to the present disclosure, the required power is delivered via a steam turbine compressor drive 155 operably coupled to the multi-stage compressor. The steam turbine compressor drive and associated heat balance diagram is shown in FIG. 6. The compressor drive 155 is designed to use a bypassed fractional portion of the SMR unit 100 steam output for powering the steam turbine compressor drive. The majority of the SMR steam flows through the steam compressor 151 for a pressure boost and then enters the inlet of the high pressure turbine 251 shown in repowered fossil generation plant system flow diagram of FIG. 7. For example, without limitation, sizing calculations inform that 185 thousand lb/hr of steam, which is approximately 11% SMR-160 steam production, is sufficient to produce the required thermal power necessary to drive the steam turbine compressor drive 155 in the modeled fossil-fueled power plant repowering scheme. The remainder of the steam output from the SMR unit (e.g., 89%) flows to the steam inlet of the HP turbine 251 (see, e.g., FIG. 7).

In one embodiment as shown in FIG. 6, the steam turbine compressor drive 155 may include an intermediate pressure (IP) steam turbine 156 mechanically coupled to a low pressure (LP) steam turbine 158 by a common turbine coupling shaft 157. The LP turbine 158 is mechanically coupled in turn to the steam compressor 151 via drive shaft 159. Drive shaft 159 may be a separate shaft than coupling shaft 157, or preferably may be an integral contiguous end portion of the same coupling shaft 157. Both turbines 156 and 158 drive (rotate) common coupling shaft 157 and drive shaft 159 whether separate or integral. A moisture separator 160 may be fluidly interposed in the steam path between the IP and LP turbines to remove any entrained moisture from the otherwise dry steam which may develop as the steam expands in the IP turbine. Moisture from separator and saturated (wet) steam exhausted by the LP turbine 158 may be directed to the condensate drain system 172 which eventually flows back into the main condenser 254 of the existing energy conversion system of the fossil plant (see, e.g., FIG. 1). The condensate drain system 172 (an example of which is shown in FIG. 2) comprises a branched piping network which collects condensate from various equipment in the energy conversion system including feedwater heater drains, moisture separator drains, etc. for return to the main condenser 254 where the drain flow mixes with the condensed steam from the LP turbine 253 which forms the feedwater.

Suitable commercially-available steam compressors usable with the present SMR retrofit scheme include integrally-geared vapor compressors available from Atlas Copco Compressors LLC of Rock Hill, South Carolina, or others.

It bears noting that although the nuclear steam supply system comprising SMR unit 100 and steam compressor system 150 are shown and described for use in repowering an existing fossil-fueled power plant, application of the invention is not limited to the repowering scheme alone. Accordingly, the pressure of the main steam output by any SMR unit may be boosted via the use of a steam compressor 151 for use in a new power generation station or plant with a nuclear steam supply system to increase the elect power MW output of the plant which may utilize an HP, IP, and LP turbine train in the turbogenerator similar to a large-scale fossil or traditional nuclear power plant. The invention is therefore not limited to fossil plant repowering schemes alone.

Although a single SMR unit has been described for replacing an existing fossil power plant steam generator, in some embodiments the steam output from 2 or more SMR units may be combined to supply main steam to the existing energy conversion system of the fossil plant.

Exemplary Embodiments

The following are non-limiting exemplary embodiments according to the present disclosure.

Embodiment 1A: A method for repowering an existing fossil-fueled power plant with nuclear fuel, the existing fossil-fueled power plant including a turbogenerator having a design inlet steam pressure and a first steam generator fluidly coupled to the turbogenerator, the first steam generator configured to combust fossil fuel to produce steam for operating the turbogenerator, the method comprising:
  fluidly uncoupling the first steam generator from the turbogenerator;
  fluidly coupling a second steam generator of a nuclear reactor to the turbogenerator;
  the second steam generator producing steam at a first pressure less than the design inlet steam pressure;
  compressing the steam at the first pressure in a steam compressor to produce steam at a second pressure greater than the first pressure; and
  flowing the steam at the second pressure to the turbogenerator which generates electricity.

Embodiment 1B: A method for repowering an existing fossil-fueled power plant with nuclear fuel, the existing fossil-fueled power plant including a turbogenerator having a design inlet steam pressure, and a first steam generator fluidly coupled to the turbogenerator, the first steam generator configured to combust fossil fuel to produce steam meeting the design inlet steam pressure, the method comprising:
  fluidly uncoupling the first steam generator from the turbogenerator;
  fluidly coupling a second steam generator of a nuclear reactor to the turbogenerator;
  the second steam generator producing steam at a first pressure less than the design inlet steam pressure;
  compressing the steam at the first pressure in a steam compressor to produce steam at a second pressure greater than the first pressure; and
  flowing the steam at the second pressure to the turbogenerator which generates electricity.

Embodiment 2: The method according to embodiments 1A or 1B, wherein the step of compressing the steam includes increasing pressure of the steam from the first pressure to a transitional pressure between the first pressure and the second pressure in a first compression stage of the steam compressor, and then increasing pressure of the steam from the transitional pressure to the second pressure in a second compression stage of the steam compressor.

Embodiment 3: The method according to embodiment 2, further comprising flowing the steam from the first compression stage to the second compression stage through an intercooler, and cooling the steam from the first compression stage in the intercooler.

Embodiment 4: The method according to embodiment 3, wherein the intercooler is a shell and tube heat exchanger.

Embodiment 5: The method according to embodiments 3 or 4, further comprising flowing steam discharged from a first pressure section of the turbogenerator through the intercooler, and reheating the steam from the first pressure section to produce reheated steam via absorbing heat from the steam flowing through the intercooler from the first compression stage of the steam compressor.

Embodiment 6: The method according to embodiment 5, further comprising flowing the reheated steam to a second pressure section of the turbogenerator.

Embodiment 7: The method according to embodiments 5 or 6, wherein:
  the first pressure section of the turbogenerator is a high pressure turbine receiving steam at the second pressure from the steam compressor and discharging the steam at a third pressure less than the second pressure, and the second pressure section of the turbogenerator is an intermediate pressure turbine receiving and operating with steam at the third pressure from the intercooler.

Embodiment 8: The method according to embodiment 7, wherein the turbogenerator further comprises a low pressure turbine which defines a third pressure section, the low pressure turbine receiving and operating with steam at a fourth pressure discharged by the intermediate pressure turbine which is less than the third pressure.

Embodiment 9: The method according to embodiment 8, wherein before the step of the low pressure turbine receiving and operating with steam at the fourth pressure discharged by the intermediate pressure turbine, further comprising steps of:

flowing the steam from the intermediate pressure turbine through a heat exchanger;

flowing a portion of the steam at the second pressure from the steam compressor through the heat exchanger;

reheating the steam from the intermediate pressure turbine via absorbing heat from the steam at the second pressure from the steam compressor to produce reheated intermediate pressure steam; and flowing the reheated intermediate pressure steam to the low pressure turbine.

Embodiment 10: The method according to any one of embodiments 2-9, wherein the second pressure produced by the second compression stage is less than the design inlet steam pressure of the turbogenerator.

Embodiment 11: The method according to any one of embodiments 2-9, wherein the second pressure produced by the second compression stage at least meets the design inlet steam pressure of the turbogenerator.

Embodiment 12: The method according to any one of embodiments 1A, 1B, and 2-4, wherein the steam compressor is driven by a steam turbine compressor drive mechanically coupled to the steam compressor.

Embodiment 13: The method according to embodiment 12, further comprising a step of driving the steam turbine compressor drive with a portion of the steam flowing at the second pressure from the second steam generator to the turbogenerator.

Embodiment 14: The method according to embodiment 13, wherein the steam turbine compressor drive include includes a first steam turbine fluidly and mechanically coupled to a second steam turbine, the second steam turbine operating at a pressure less than the first steam turbine.

Embodiment 15: The method according to embodiment 14, wherein steam flows from the first steam turbine to the second steam turbine through a moisture separator.

Embodiment 16: The method according to any one of embodiments 1A, 1B, and 2-15, wherein the existing fossil-fueled power plant is a coal-fired power plant.

Embodiment 17: The method according to any one of embodiments 1A, 1B, and 2-16, wherein the nuclear reactor is a small modular reactor unit comprising a reactor vessel having a nuclear fuel core which heats a primary coolant that circulates through the second steam generator to produce the steam at the first pressure.

Embodiment 18: A power plant fueled by nuclear fuel comprising:

a nuclear steam supply system comprising a nuclear reactor which heats a primary coolant that circulates through a steam generator configured and operable to heat and convert a liquid secondary working fluid to main steam at a first pressure;

an energy conversion system comprising a turbogenerator including a steam turbine fluidly coupled to the steam generator and operably coupled to an electric generator configured to produce electricity;

a steam compressor in fluid communication with the steam turbine and the steam generator;

the steam compressor being configured and operable to receive main steam at the first pressure from the steam generator, and increase pressure of the main steam from the first pressure to a higher second pressure to operate the turbogenerator.

Embodiment 19: The power plant according to embodiment 18, wherein the steam compressor includes a first compression stage operable to increase the pressure of the main steam from the first pressure to a transitional pressure, and a second compression stage operable to increase the pressure of the main steam from the transitional pressure to the second pressure.

Embodiment 20: The power plant according to embodiment 19, further comprising an intercooler fluidly interposed between the first and second compression stages, the intercooler operable to cool the main steam flowing from the first compression stage to the second compression stage.

Embodiment 21: The power plant according to embodiment 20, wherein the intercooler is a shell and tube heat exchanger.

Embodiment 22: The power plant according to embodiments 20 or 21, wherein the main steam flowing from the first compression stage to the second compression stage is cooled via main steam at a third pressure discharged from the steam turbine after passing through a portion of the steam turbine, the main steam at the third pressure having a temperature less than the temperature of the main steam leaving the first compression stage of the steam compressor.

Embodiment 23: The power plant according to embodiment 22, wherein the steam turbine of the turbogenerator includes, in operable fluid coupling:

a high pressure turbine which receives and operates with the main steam from the steam generator at the second pressure, an intermediate pressure turbine which receives and operates with the main steam discharged from the high pressure turbine at the third pressure less than the second pressure, and a low pressure turbine which receives and operates with the main steam discharged from the intermediate pressure turbine at a fourth pressure less than the third pressure; and wherein the main steam discharged at the third pressure after passing through a portion of the steam turbine is discharged from the high pressure turbine.

Embodiment 24: The power plant according to embodiment 23, wherein the main steam at the third pressure is reheated in the intercooler to produce reheated main steam via heat absorbed from the main steam flowing through the intercooler from the first compression stage of the steam compressor, and wherein the reheated main steam flows to the intermediate pressure turbine.

Embodiment 25: The power plant according to embodiments 23 or 24, further comprising a reheater heat exchanger fluidly coupled between the intermediate pressure turbine and the low pressure turbine, the reheater heat exchanger configured and operable to increase a temperature of the main steam discharged by the intermediate pressure turbine via absorbing heat from a portion of the main steam discharged by the steam generator at the second pressure which flows through the reheater heat exchanger.

Embodiment 26: The power plant according to embodiment 25, wherein the reheater heat exchanger is a shell and tube heat exchanger.

Embodiment 27: The power plant according to any one of embodiments 18-26, wherein the steam compressor is driven by a steam turbine compressor drive mechanically coupled to the steam compressor.

Embodiment 28: The power plant according to embodiment 27, wherein the steam turbine compressor drive is fluidly coupled to the steam generator and configured to operate with a portion of the main steam discharged at the second pressure by the steam generator.

Embodiment 29: The power plant according to embodiment 28, wherein a majority portion of the main steam at the second pressure discharged by the steam generator flows to the steam turbine of the turbogenerator.

Embodiment 30: The power plant according to embodiments 28 or 29, wherein the steam turbine compressor drive includes a first steam turbine fluidly and mechanically coupled to a second steam turbine, the second steam turbine operating at a main steam pressure less than the first steam turbine.

Embodiment 31: The power plant according to embodiment 30, wherein main steam flows from the first steam turbine to the second steam turbine through a moisture separator.

Embodiment 32: The power plant according to any one of embodiments 19-31, wherein the second pressure produced by the second compression stage of the steam compressor is less than a design inlet steam pressure of the turbogenerator.

Embodiment 33: The power plant according to any one of embodiments 19-31, wherein the second pressure produced by the second compression stage of the steam compressor at least meets a design inlet steam pressure of the turbogenerator.

Embodiment 34: A method for generating electric power using nuclear fuel, the method comprising:

generating steam in a nuclear steam supply system comprising a steam generator fluidly coupled to a reactor vessel containing a nuclear fuel core, the steam leaving the steam generator as main steam at a first pressure;

flowing the main steam through a steam compressor fluidly coupled to the steam generator;

compressing the main steam to increase pressure of the main steam from the first pressure to a higher second pressure;

flowing the main steam at the second pressure to a turbogenerator comprising a steam turbine operably coupled to an electric generator; and generating electricity via the electric generator.

Embodiment 35: The method according to embodiment 34, wherein the step of compressing the main steam includes first increasing pressure of the main steam from the first pressure to a transitional pressure between the first pressure and the second pressure in a first compression stage, and then increasing pressure of the main steam from the transitional pressure to the second pressure in a second compression stage.

Embodiment 36: The method according to embodiment 35, further comprising flowing the main steam from the first compression stage to the second compression stage through an intercooler, and cooling the main steam from the first compression stage in the intercooler.

Embodiment 37: The method according to embodiment 36, wherein the intercooler is a shell and tube heat exchanger.

Embodiment 38: The method according to embodiments 36 or 37, further comprising:

flowing main steam discharged from a first pressure section of the steam turbine through the intercooler, the main steam from the first pressure section having a third pressure less than the second pressure; and reheating the main steam from the first pressure section to produce reheated main steam via absorbing heat from the main steam flowing through the intercooler from the first compression stage of the steam compressor.

Embodiment 39: The method according to embodiment 38, further comprising flowing the reheated main steam to a second pressure section of the steam turbine.

Embodiment 40: The method according to embodiment 39, wherein:

the first pressure section of the steam turbine is a high pressure turbine receiving main steam at the second pressure from the steam compressor and discharging the main steam at the third pressure, and the second pressure section of the turbogenerator is an intermediate pressure turbine which discharges the reheated main steam at a fourth pressure less than the third pressure.

Embodiment 41: The method according to embodiment 40, wherein the steam turbine further comprises a low pressure turbine which defines a third pressure section, the low pressure turbine receiving main steam discharged by the intermediate pressure turbine.

Embodiment 42: The method according to embodiment 41, wherein before the step of the low pressure turbine receiving main steam discharged by the intermediate pressure turbine, further comprising steps of:

flowing the reheated main steam discharged by the intermediate pressure turbine through a first fluid path in a heat exchanger;

flowing a portion of the main steam at the second pressure from the steam compressor through a second fluid path in the heat exchanger fluidly isolated from the first fluid path;

heating the reheated main steam discharged by the intermediate pressure turbine via absorbing heat from the main steam at the second pressure from the steam compressor; and flowing the reheated intermediate main steam which has been heated to the low pressure turbine.

Embodiment 43: The method according to any one of embodiments 34-42, wherein the second pressure produced by the second compression stage of the steam compressor is less than a design inlet steam pressure of the turbogenerator.

Embodiment 44: The method according to any one of embodiments 34-42, wherein the second pressure produced by the second compression stage at least meets a design inlet steam pressure of the turbogenerator.

Embodiment 45: The method according to any one of embodiments 34-44, wherein the steam compressor is driven by a steam turbine compressor drive mechanically coupled to the steam compressor.

Embodiment 46: The method according to embodiment 45, further comprising a step of driving the steam turbine compressor drive with a portion of the main steam flowing at the second pressure from the second steam generator to the turbogenerator.

Embodiment 47: The method according to embodiment 46, wherein the steam turbine compressor drive include includes a first steam turbine fluidly and mechanically coupled to a second steam turbine, the second steam turbine operating at a steam pressure less than the first steam turbine.

Embodiment 48: The method according to embodiment 47, wherein main steam flows from the first steam turbine to the second steam turbine through a moisture separator.

Embodiment 49: The method according to any one of embodiments 34-48, wherein the step of generating the steam comprises heating primary coolant in the reactor vessel via the nuclear fuel core and circulating the primary coolant through the steam generator which heats a liquid secondary working fluid to generate the main steam.

Embodiment 50: The method according to embodiment 49, wherein the primary coolant passively circulates between the reactor vessel and the steam generator via gravity-driven thermo-siphon flow without assistance of pumps.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents.

What is claimed is:

1. A power plant fueled by nuclear fuel comprising:
a nuclear steam supply system comprising a nuclear reactor which heats a primary coolant that circulates through a steam generator configured and operable to heat and convert a liquid secondary working fluid to main steam at a first pressure;
an energy conversion system comprising a turbogenerator including a steam turbine fluidly coupled to the steam generator and operably coupled to an electric generator configured to produce electricity; and
a steam compressor in fluid communication with the steam turbine and the steam generator;
the steam compressor being configured and operable to receive main steam at the first pressure from the steam generator, and increase pressure of the main steam from the first pressure to a higher second pressure to operate the turbogenerator;
wherein the steam compressor is driven by a steam turbine compressor drive mechanically coupled to the steam compressor;
wherein the steam turbine compressor drive is fluidly coupled to the steam generator and configured to operate with a portion of the main steam discharged at the first pressure by the steam generator.

2. The power plant according to claim 1, wherein the steam compressor includes a first compression stage operable to increase the pressure of the main steam from the first pressure to a transitional pressure, and a second compression stage operable to increase the pressure of the main steam from the transitional pressure to the second pressure.

3. The power plant according to claim 2, further comprising an intercooler fluidly interposed between the first and second compression stages, the intercooler operable to cool the main steam flowing from the first compression stage to the second compression stage.

4. The power plant according to claim 3, wherein the intercooler is a shell and tube heat exchanger.

5. The power plant according to claim 3, wherein the main steam flowing from the first compression stage to the second compression stage is cooled via main steam at a third pressure discharged from the steam turbine after passing through a portion of the steam turbine, the main steam at the third pressure having a temperature less than the temperature of the main steam leaving the first compression stage of the steam compressor.

6. The power plant according to claim 5, wherein the steam turbine of the turbogenerator includes, in operable fluid coupling:
a high pressure turbine which receives and operates with the main steam from the steam generator at the second pressure, an intermediate pressure turbine which receives and operates with the main steam discharged from the high pressure turbine at the third pressure less than the second pressure, and a low pressure turbine which receives and operates with the main steam discharged from the intermediate pressure turbine at a fourth pressure less than the third pressure; and
wherein the main steam discharged at the third pressure after passing through a portion of the steam turbine is discharged from the high pressure turbine.

7. The power plant according to claim 6, wherein the main steam at the third pressure is reheated in the intercooler to produce reheated main steam via heat absorbed from the main steam flowing through the intercooler from the first compression stage of the steam compressor, and wherein the reheated main steam flows to the intermediate pressure turbine.

8. The power plant according to claim 7, further comprising a reheater heat exchanger fluidly coupled between the intermediate pressure turbine and the low pressure turbine, the reheater heat exchanger configured and operable to increase a temperature of the main steam discharged by the intermediate pressure turbine via absorbing heat from a portion of the main steam discharged by the steam generator at the second pressure which flows through the reheater heat exchanger.

9. The power plant according to claim 8, wherein the reheater heat exchanger is a shell and tube heat exchanger.

10. The power plant according to claim 1, wherein a majority portion of the main steam at the first pressure discharged by the steam generator flows to the steam turbine of the turbogenerator.

11. The power plant according to claim 1, wherein the steam turbine compressor drive includes a first steam turbine fluidly and mechanically coupled to a second steam turbine, the second steam turbine operating at a main steam pressure less than the first steam turbine.

12. The power plant according to claim 11, wherein main steam flows from the first steam turbine to the second steam turbine through a moisture separator.

13. The power plant according to claim 2, wherein the second pressure produced by the second compression stage of the steam compressor is less than a design inlet steam pressure of the turbogenerator.

14. The power plant according to claim 2, wherein the second pressure produced by the second compression stage of the steam compressor at least meets a design inlet steam pressure of the turbogenerator.

15. A power plant fueled by nuclear fuel comprising:

a nuclear steam supply system comprising a nuclear reactor which heats a primary coolant that circulates through a steam generator configured and operable to heat and convert a liquid secondary working fluid to main steam at a first pressure;

an energy conversion system comprising a turbogenerator including a steam turbine fluidly coupled to the steam generator and operably coupled to an electric generator configured to produce electricity; and a steam compressor in fluid communication with the steam turbine and the steam generator, the steam compressor comprising a first compression stage operable to increase the pressure of the main steam from the first pressure to a transitional pressure, and a second compression stage operable to increase the pressure of the main steam from the transitional pressure to a second pressure for introduction to the steam turbine; and an intercooler fluidly interposed between the first and second compression stages of the steam compressor, the intercooler operable to cool the main steam flowing from the first compression stage to the second compression stage;

wherein the main steam flowing from the first compression stage to the second compression stage is cooled via main steam at a third pressure discharged from the steam turbine after passing through a portion of the steam turbine, the main steam at the third pressure having a temperature less than the temperature of the main steam leaving the first compression stage of the steam compressor.

16. The power plant according to claim 15, wherein the intercooler is a shell and tube heat exchanger.

17. The power plant according to claim 15, wherein the steam turbine includes a high pressure turbine and an intermediate pressure turbine in operable fluid coupling, and the intercooler comprises:

a cooling fluid path disposed between the first compression stage and the second compression stage of the steam compressor; and a reheating fluid path disposed between the high pressure turbine and the intermediate pressure turbine of the steam turbine, the reheating fluid path and cooling fluid path configured to flow the main steam in opposite directions.

18. A power plant fueled by nuclear fuel comprising:

a nuclear steam supply system comprising a nuclear reactor which heats a primary coolant that circulates through a steam generator configured and operable to heat and convert a liquid secondary working fluid to main steam at a first pressure;

an energy conversion system comprising a turbogenerator including a steam turbine fluidly coupled to the steam generator and operably coupled to an electric generator configured to produce electricity, the steam turbine including a high pressure turbine, an intermediate pressure turbine, and a low pressure turbine in successively arranged in operable fluid coupling;

a steam compressor in fluid communication with the steam turbine and the steam generator and operable to increase the pressure of the main steam from the first pressure to a second pressure, the steam compressor including a first compression stage and a second compression stage; and a heat exchanger comprising:

a cooling fluid path disposed between the first compression stage and the second compression stage of the steam compressor and configured to flow the main steam between the first compression stage and the second compression stage; and a reheating fluid path disposed between the high pressure turbine and the intermediate pressure turbine of the steam turbine, the reheating fluid path configured to flow the main steam between the high pressure turbine and the intermediate pressure turbine;

wherein the heat exchanger is configured to transfer enthalpy from the main steam flowing through the cooling fluid path to the main steam flowing through the reheating fluid path.

19. The power plant according to claim 18, wherein the heat exchanger is a shell and tube heat exchanger.

20. The power plant according to claim 18, wherein the first compression stage of the steam compressor is operable to increase the pressure of the main steam from the first pressure to a transitional pressure, and the second compression stage of the steam compressor is operable to increase the pressure of the main steam from the transitional pressure to the second pressure for introduced to the high pressure turbine.

* * * * *